(12) United States Patent
Liu et al.

(10) Patent No.: US 7,839,852 B2
(45) Date of Patent: Nov. 23, 2010

(54) APPARATUS AND METHOD FOR RADIO TRANSMISSION OF REAL-TIME IP PACKETS USING HEADER COMPRESSION TECHNIQUE

(75) Inventors: Sheng Liu, Guangdong (CN); Baijun Zhao, Guangdong (CN)

(73) Assignee: UTStarcom (China) Co. Ltd., Beijing (CN)

( * ) Notice: Subject to any disclaimer, the term of this patent is extended or adjusted under 35 U.S.C. 154(b) by 713 days.

(21) Appl. No.: 10/577,641

(22) PCT Filed: Oct. 30, 2003

(86) PCT No.: PCT/CN03/00925

§ 371 (c)(1),
(2), (4) Date: Feb. 21, 2007

(87) PCT Pub. No.: WO2005/043856

PCT Pub. Date: May 12, 2005

(65) Prior Publication Data

US 2007/0248075 A1    Oct. 25, 2007

(51) Int. Cl.
*H04L 12/56* (2006.01)
(52) U.S. Cl. .................. 370/392; 370/389; 370/471
(58) Field of Classification Search .......... 370/338, 370/471, 349, 395.6, 389, 333, 351, 392, 370/394, 395.52, 474; 704/270.1
See application file for complete search history.

(56) References Cited

U.S. PATENT DOCUMENTS

| | | | |
|---|---|---|---|
| 6,314,095 B1 * | 11/2001 | Loa | 370/352 |
| 6,542,504 B1 | 4/2003 | Mahler et al. | 370/392 |
| 6,751,209 B1 * | 6/2004 | Hamiti et al. | 370/349 |
| 6,839,339 B1 * | 1/2005 | Chuah | 370/349 |
| 7,002,993 B1 * | 2/2006 | Mohaban et al. | 370/471 |
| 7,076,560 B1 * | 7/2006 | Lango et al. | 709/231 |
| 7,313,152 B2 * | 12/2007 | Westphal | 370/468 |
| 7,369,844 B2 * | 5/2008 | Hestir | 455/417 |
| 7,450,586 B2 * | 11/2008 | Davila et al. | 370/393 |
| 7,562,277 B2 * | 7/2009 | Park et al. | 714/748 |
| 2001/0041981 A1 * | 11/2001 | Ekudden et al. | 704/270.1 |
| 2002/0097701 A1 * | 7/2002 | Lupien et al. | 370/338 |
| 2002/0191556 A1 * | 12/2002 | Krishnarajah et al. | 370/329 |

(Continued)

FOREIGN PATENT DOCUMENTS

CN        1340255 A        3/2002

(Continued)

*Primary Examiner*—William Trost, IV
*Assistant Examiner*—Emmanuel Maglo
(74) *Attorney, Agent, or Firm*—Seed IP Law Group PLLC

(57) ABSTRACT

The present invention provides an apparatus and method of radio transmission of real-time IP packets using header compression technique. In the present invention, the size of a compressed header of an RTP packet can be adapted to length types required by the system by adding a radio link adaptation unit to the existing PDCP entity. The method comprises header-compressing the RTP packets, to obtain header-compressed RTP packets having a plurality of different header compression lengths; pre-configuring header compression lengths and length types required by the system; and PDU-size adapting the plurality of different header compression lengths of the header-compressed RTP packets, so as to comply with said lengths and length types required by the system.

25 Claims, 11 Drawing Sheets

U.S. PATENT DOCUMENTS

2003/0189900 A1* 10/2003 Barany et al. .............. 370/229
2005/0213546 A1* 9/2005 Reitter et al. .............. 370/338

FOREIGN PATENT DOCUMENTS

| EP | 1 056 259 A1 | 11/2000 |
| EP | 1 328 122 A1 | 7/2003 |
| WO | WO 03/032609 A2 | 4/2003 |

* cited by examiner

APPARATUS AND METHOD FOR RADIO TRANSMISSION OF REAL-TIME IP PACKETS USING HEADER COMPRESSION TECHNIQUE

FIELD OF THE INVENTION

The present invention relates to techniques of Packet Data Convergence Protocol (PDCP) in a Universal Mobile Telecommunication System (UMTS), in particular, to a method and apparatus for effectively transmitting real time IP packet using header compression technique.

BACKGROUND OF THE INVENTION

Universal Mobile Telecommunication System (UMTS) is the third generation mobile communication system in which the radio technology adopts WCDMA, and its standardization efforts have been completed by the third generation partner project (3GPP) organization. So far four versions have been developed, i.e. Release 99, Release 4, Release 5 and Release 6. In Release 5, a new domain, i.e. an IP multimedia subsystem (IMS) domain has been introduced by UMTS core network on the basis of existing circuit switching (CS) domain and packet switching (PS) domain.

The IMS domain primarily provides IP multimedia services such as voice, audio and video that have high real-time requirements. According to 3GPP specification TS26.236, the user plane transport protocol of a session-type IP multimedia service in the IMS domain adopts the real-time media transport protocol defined by the Internet Engineering Technology Force (IETF): real-time transport protocol (RTP) and real-time transport control protocol (RTCP), as shown in FIG. 1. RTP is used for carrying real-time media coding data, while RTCP is used for periodically transmitting such information as quality parameters of the media transmission. RTPRTCP runs above the user datagram protocol (UDP), wherein RTP streams use even-numbered UDP ports, while the corresponding RTCP streams use adjacent odd-numbered UDP ports. As to a detailed description of RTP and RTCP, see IETF document RFC1889.

A typical RTP header is 12 bytes in length, a typical UDP header is 8 bytes in length, a typical IPv4 header is 20 bytes in length, and a typical Ipv6 header is 40 bytes in length. Therefore, an RTPUDP/IPv4 packet header is 320 bits in length, while an RTP/UDP/IPv6 packet header is 480 bits in length. In addition, the length of the RTP payload is usually relatively short in length. As shown in FIG. 1, the RTP payload consists of the header and media coding data. Taking a VoIP service employing an adaptive multirate (AMR) voice codec in the IMS domain as an example, the format of its RTP payload follows IETF standard RFC3267. According to the mode parameters of the employed payload format and rates of the AMR voice codec, etc., the length of AMR voice RTP payload in the IMS domain is about 14 to 34 bytes. It is apparent that, the header overhead of the RTP/UDP/IP packet is large, and directly transmitting them on the radio interface will greatly reduce channel efficiency. Therefore, an effective header compression algorithm is desirable to improve transmission efficiency of the radio interface.

A robust header compression (ROHC) algorithm specified by IETF standard RFC 3095 is employed in UMTS to achieve the header compression of the RTPRTCP packet of the IP multimedia service in the IMS domain. ROHC is an effective RTP/UDP/IP and UDP/IP (for example, RTCP, etc.) header compression algorithm designed for long round trip time (RTT) and high bit error rate of the radio link. In ROHC, three compression states having different compression efficiencies are defined, i.e. IR, FO and SO. In the IR state, a compressing end transmits a static and/or dynamic field of the packet header to a decompressing end, so as to create or update a context between the compressing end and decompressing end. In the SO state, the compressing end and the decompressing end have reached a reliable synchronization between them, the change in headers of successive packets is completely predictable, thus it is possible to achieve the highest compression rate. The FO state is such a compression state that its compression rate lies between IR and SO, in which state a small number of packet header fields change irregularly, as a result, the compression rate thereof is lower than that of the SO state. In addition, depending on the difference of one-way/two-way channel and of the way of triggering the compression state migration, the ROHC algorithm has three different operating modes, i.e., U, O and R. As shown in FIG. 2, the ROHC operation always starts from the U mode, and thereafter transfers to the O mode or R mode depending on different feedback information. The U operating mode does not utilize feedback information from the decompressing end, but only achieves the synchronization of the context between the compressing end and the decompressing end by periodically returning to a lower compression rate state from a higher compression rate state. Both O and R modes need the feedback information from the decompressing end, and returning to the lower compression rate state from the higher compression rate state is based on a negative acknowledgement (NACK) from the decompressing end. However, in the O operating mode, the way of migrating to the higher compression rate state from the lower compression rate state is similar to the U operating mode, that is, based on an optimistic judgement of the compressing end that the decompressing end has taken the information on the context, while in the R operating mode, migrating from the lower compression rate state to the higher compression rate state is still based on the feedback information from the decompressing end, i.e. an acknowledgement (ACK) reply of the decompressing end. Therefore, the R operating mode has the highest reliability, but its channel overhead is slightly higher than the other two modes due to an increase in the feedback information.

In the ROH protocol, due to differences in the operating modes and compression states, the header-compressed packets, transmitted from the compressing end to the decompressing end, include Packet Type 0 (UO-0, R-0, R-0-CRC), Packet Type 1 (R mode: R-1, R-1-TS, R-1-ID), Packet Type 1 (UO mode: UO-1, UO-1-TS, UO-1-ID), Packet Type 2 (UOR-2, UOR-2-TS, UOR-2-ID), etc., and the packets transmitted from the compressing end to the decompressing end for initializing/updating the context have two types: IR and IR-DYN, and the packets fed back from the decompressing end to the compressing end have such types as Feedback-1 and Feedback-2, etc. Even for packets of the same type, many factors (such as an extended field, a checksum field of UDP, an ROHC segmentation processing, and feedback type packet) will render their length uncertain. Therefore, the header size of an ROHC header compressed packet varies in a wide range from the shortest one byte to slightly larger than the entire header length, but the length of most compressed headers is small.

FIG. 3 shows the architecture of a UMTS radio access network (UTRAN), wherein radio network controllers (RNCs) are connected to the core network via Iu interfaces, the RNCs are interconnected via an Iur interface, and an RNC is connected to one or more Node B's via an Iub interface. One Node B comprises one or more cells which is an elementary unit of radio access for a user equipment (UE), wherein a radio interface between UE and UTRAN is a Un interface.

FIG. 4 shows the structure of a UMTS radio interface protocol, wherein the bottom layer is a physical layer (PHY). In the control plane, layers above the physical layer are the media access control (MAC)layer, the radio link control (RLC) layer and the radio resource control (RRC) layer, respectively. The user plane radio interface protocol consists of a physical layer, a MAC layer, an RLC layer and a packet data convergence protocol (PDCP) layer, wherein the PDCP layer is used only for the PS domain, it improves the frequency spectrum utilization ratio of the radio transmission by means of header compression and provides a radio bearer (RB) service for an upper layer. The physical layer provides a physical channel; the channels between the MAC layer and the physical layer are transport channels, and a plurality of transport channels may be multiplexed into one physical channel. The channels between the MAC layer and the RLC layer are logical channels, and a plurality of logical channels may be multiplexed into one transport channel via the MAC layer.

According to 3GPP specification such as 3GPP TS25.212, 3GPP TS25.302, a transport format indicator (TFI) accompanying each transport channel corresponds to a transport format in a transport format set (TFS) of the transport channel. In each transport time interval (TTI), as shown in FIG. 5, the upper layer transmits transmission blocks (TB) of each transport channel to the physical layer according a certain transport format combination (TFC). The physical layer combines the TFI information from different transport channels into a transport format combination indicator (TFCI) and transmits it in a TFCI field of the physical channel after it is encoded, and the receiving end can correctly receive each transport channels by decoding the TFCI field. Here, a set consisting of transport format combinations (TFCs) of different transport channels is referred to as a transport format combination set (TFCS). In general, due to limitations on TFCS coding bits and reliability requirement, TFCS cannot be too large, in particular, when a downlink share channel (DSCH) is accompanied and a hard split mode TFCI coding is used, the available TFCI coding bits can only be 5 bits, thus the largest permissible TFCS does not exceed 32.

In UMTS, the RLC protocol provides segmentation and retransmission services for user and control data. Depending on different application requirements, RLC supports three operating modes: transparent mode (TM), unacknowledged mode (UM) and acknowledged mode (AM). Table 1 lists functions of the three operating modes of the RLC protocol. The TM mode RLC layer does not add any header overhead, thus is adapted to a delay-sensitive session type real-time service, and its segmentation and reassembly functions require that SDU (service data unit) be an integer multiple of PDU (protocol data unit) in length. UM and AM modes have concatenation, padding, segmentation and reassembly functions. Therefore, regardless of the length of SDU, SDU can be divided into PDUs of fixed lengths for transmission on the radio channel. In contrast, the AM mode also supports an automatic retransmission request (ARQ) function, it provides a transmission capability of low bit error rate at the cost of delay increase. Therefore, the AM mode is primarily used for non-real-time packet type service, while the UM mode is primarily applied to time-critical stream type real-time service.

TABLE 1

| MODE | FUNCTION |
| --- | --- |
| TM (Transparent Mode) | Segmentation and reassembly<br>SDU discard<br>Transfer of user data |
| UM (Unacknowledged Mode) | Segmentation and reassembly<br>Concatenation<br>Padding<br>Transfer of user data<br>Ciphering<br>Sequence number check<br>SDU discard |
| AM (Acknowledged Mode) | Segmentation and reassembly<br>Concatenation<br>Padding<br>Transfer of user data<br>Error correction<br>In-sequence delivery of upper layer PDUs<br>Duplicate detection<br>Flow control<br>Protocol error detection and recovery<br>Ciphering<br>SDU discard |

According to 3GPP specification TS23.107, each UMTS bearer service consists of a radio access bearer (RAB) service and a core network bearer service, and the radio access bearer service consists of an Iu bearer service and a radio bearer (RB) service. In a schematic diagram showing an instance of a structure of the PDCP layer in FIG. 6, each PDCP entity 60-62 provides a radio bearer (RB) for the upper layer, i.e. one RB corresponds to one PDCP entity, and each PDCP entity can use 0, 1 or a plurality of header compression algorithms according the configuration. Only two types of header compression algorithms are supported in the present protocol version, i.e. RFC 2507 (IPHC) and RFC 3095 (ROHC), wherein IPHC is primarily applied to a non-real-time packet service based on TCP/IP, etc., while ROHC is applied to a realtime packet service based on RTP/UDPIP, etc. Besides the header compression function, the PDCP layer also has a SDU sequence number maintaining function so as to support a relocation function of a lossless source radio network subsystem (SRNS), but this function requires the use of AM mode RLC to provide a sequential delivery function and thus is primarily applied to the non-real-time packet service. The 0, 1 and 3 bytes added respectively on the basis of the header-compressed packet output by the header compression algorithm (IPHC, and ROHC, etc.) in the PDCP protocol form three PDCP layer PDU formats, i.e. PDCP-No-Header PDU, PDCP Data PDU and PDCP SeqNum PDU, as shown in FIG. 8, wherein the PDCP SeqNum PDU has a sequence number field for supporting the relocation function of the lossless SRNS.

According to 3GPP TS23.228, TS23.207, TR21.877, application level signalling and media data of the session type real-time IP multimedia service in the IMS field generally use a separated UMTS bearing channel so as to ensure the desired quality of service (QoS) of the application level signalling (for example, SIP-session initiation protocol). Different types of media data streams generally use separated UMTS bearing channels for transmission due to significance differences in the Qos requirements. The same type of media data stream consists of RTP/UDP/IP and RTCP/UDP/IP packets, and can be transported on the separated or the same UMTS bearing channels. For the same type of media RTP/UDP/IP packet, as described in 3GPP documents such as "Tdoc R2-001422, Status of the ROHC WG in IETF and Response to Questions from RAN WG2", the RTP payload and the compressed header may be transported on different radio links, so as to provide better protection for the compressed header. In addition, for IMS services such as AMR or AMR-WB (wideband AMR), TR21.877 also gives some possible signalling modes for delivering the RTP payload format information, including an RTP payload header, media data bits of different error sensitivities (for example, A/B/C type bits in an AMR voice), to the RNC during signalling stages such as service call setup, such that it is possible to further apply an non-equal error protection (UDP) mechanism to the RTP payload.

As described before, for the session type real-time IP multimedia service in the IMS domain, the PDCP layer employs the ROHC header compression algorithm to improve transport efficiency of the radio interface. However, the header of the ROHC header compressed packet (including overhead bytes added in the PDCP layer) has a header size varying in a wide range from the shortest one byte to slightly larger than the entire header length. In addition, due to the real-time requirement on the session type IP multimedia service in the IMS domain, only TM or UM mode RLC can be adopted. However, due to the following reasons, it is difficult for the two RLC modes effectively and directly to support transmission of PDCP layer PDU which uses ROHC header compression and has a high real-time requirement:

1) The TM mode does not support the padding function but can only transports the upper layer PDU transparently. However, the header size of the ROHC header-compressed packet from the upper layer is changeable in a wide range, thus a huge TFS must be employed to cover all the possible packet header sizes, which reduces the reliability of the TFCI decoding and complicates the physical layer processing.
2) Although the UM mode supports the padding function, the current protocol does not have specific signallings and methods to dynamically control concatenation, segmentation and reassembly functions under the UM mode, as a result, delay inevitably increases. In addition, when UEP mechanism for separately transporting the compressed header and the RTP payload is used, since RTP payload rate is constant but a compressed header rate is variable, a synchronization problem between them occurs.

SUMMARY OF THE INVENTION

The present invention is proposed in view of the above problems. An object of the invention is to provide a system and method that can adapt to the size of a PDCP layer PDU corresponding to a header-compressed RTP packet, to thereby limit the types of PDU size to ones that will facilitate physical layer processing.

Another object of the invention is to provide a system and method that can separate, at the transmitting end, the compressed header and the RTP payload onto different RLC entities for synchronous transmission, and combine, at the receiving end, the separated compressed header and the RTP payload.

Another object of the invention is to provide a system and method that can separate, at the transmitting end, the RTP packets into blocks of different error sensitivities based on the RTP payload format information, and synchronously transmit these blocks on different RLC entities, while combine, at the receiving end, the separated data blocks.

Another object of the invention is to provide a system and method for scheduling RTCP to save radio resources and bandwidth.

The above objects of the invention may be achieved by the systems and methods of the invention.

According to an aspect of the invention, a method of radio transmission of real-time IP packets using header compression is provided, comprising: header-compressing RTP packets to obtain header-compressed RTP packets having a plurality of different header compression lengths; pre-configuring header compression lengths and length types required by the system; and PDU-size adapting the plurality of different header compression lengths of the header-compressed RTP packets, so as to comply with said lengths and length types required by the system.

According to another aspect of the invention, a system of radio transmission of real-time IP packet using header compression is provided, comprising: header compression unit for header-compressing RTP packets to obtain header-compressed RTP packets having a plurality of different header compression lengths; configuring unit for pre-configuring header compression lengths and length types required by the system; and radio link adaptation unit for PDU-size adapting the plurality of different header compression lengths of the header-compressed RTP packets, so as to comply with said lengths and length types required by the system.

One of the differences between the present invention and the prior art lies in that a radio link adaptation unit is added to the PDCP entity according to the present invention. The radio link adaptation unit can adapt the size of the compressed header of headercompressed RTP packet, thereby adapting the compressed header size to one of a plurality of predetermined lengths, so as to eliminate the problem that the compressed header size varies in a wide range in the prior art.

According to another aspect of the invention, a method of transmitting real-time IP packets using header compression is provided, comprising: header-compressing RTP packets and marking a compressed header and an RTP payload; separating the compressed header from the RTP payload based on said mark, to respectively form PDCP layer PDUs before mapping them to different RLC entities; and transmitting the separated compressed header and RTP payload.

According to another aspect of the invention, a method of receiving real-time IP packets using header compression is provided, wherein a compressed header of the header-compressed packet is separated from an RTP payload thereof at the transmitting end to form different PDCP layer PDUs that are transmitted on different RLC entities, said method comprising: receiving and extracting the compressed header and the RTP payload from SDUs of the RLC entities; and combining the extracted compressed header with the RTP payload.

The present invention also provides systems corresponding to the above methods of transmitting and receiving real-time IP packets using header compression.

The radio link adaptation unit may separate the compressed header from the RTP payload, and apply different error protection mechanisms to them respectively, and can achieve synchronous transmission.

According to a preferable embodiment of the invention, the radio link adaptation unit may further divide the RTP packet into blocks of different error sensitivities based on the RTP payload format information so as to apply different error protection mechanisms to different blocks, and synchronously transmit the different blocks on different transport channels, According to yet another aspect of the invention, an RTCP packet scheduling method is provided, comprising: monitoring whether or not the bandwidth requirement of the RTP packet exceeds a predetermined value; if the bandwidth requirement of the RTP packet exceeds the predetermined value and there is an RTCP packet to be transmitted, buffering the RTCP packet; continuously monitoring the bandwidth requirement of the RTP packet, and transmitting the RTCP packet when the bandwidth requirement is lower than the predetermined value.

According to still another aspect of the invention, an RTCP packet scheduling system is provided, comprising: bandwidth monitoring means for monitoring whether or not the bandwidth requirement of the RTP packet exceeds a predetermined value; judging means for judging, whether the bandwidth requirement of the RTP packet exceeds the predetermined value and there is an RTCP packet to be transmitted; buffering means for buffering the RTCP packet, in response to the result of the judging means that the bandwidth requirement of the RTP packet exceeds the predetermined value; and transmitting means for transmitting the RTCP packet, in response to the result of the judging means that the bandwidth requirement of the RTP packet does not exceed the predetermined value.

Since the RTCP packet has a low real-time requirement, its transmission may be suitably delayed. Therefore, the radio link adaptation unit schedules the transmission of the RTCP packet, such that it is not transmitted while the transmission of the RTP packet needs much radio resources, thus radio resources and bandwidth are efficiently utilized.

DETAILED DESCRIPTION OF THE PREFERRED EMBODIMENT

Preferable embodiments of the innovation will be described blow with reference to the attached drawings.

Figure 1:
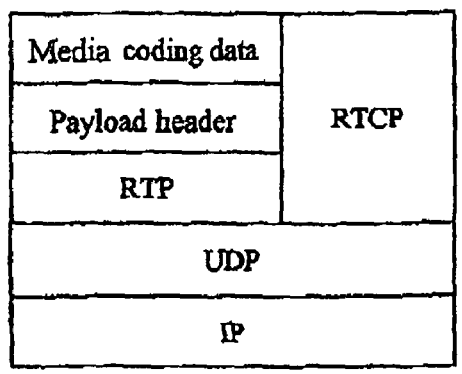
FIG. 1 shows a user plane transport protocol of an IP multimedia service.
Figure 2:
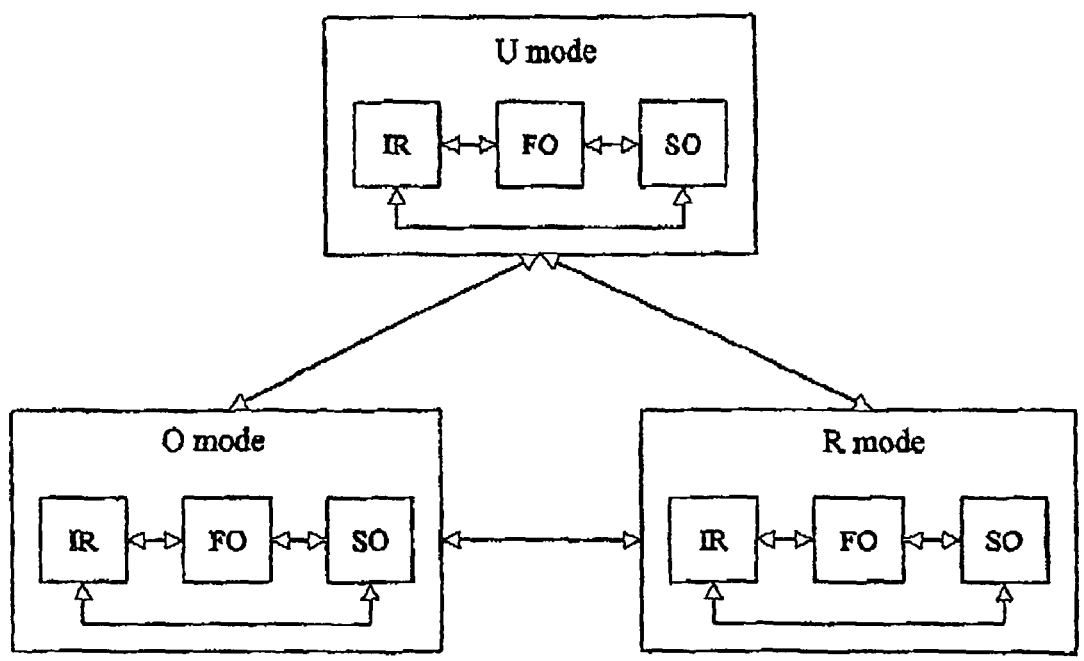
FIG. 2 is a schematic diagram showing an operating mode and a compression state of an ROHC algorithm.
Figure 3:
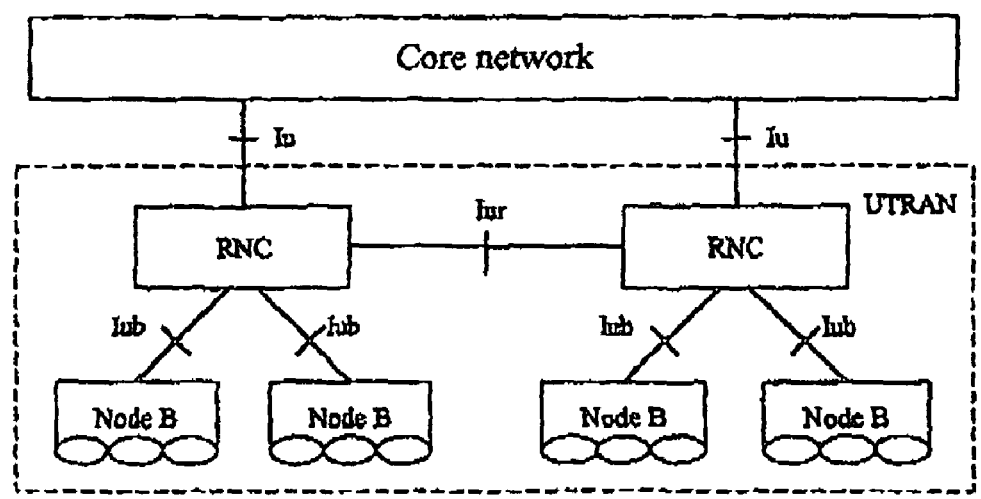
FIG. 3 shows a structure of a UTRAN network.
Figure 4:
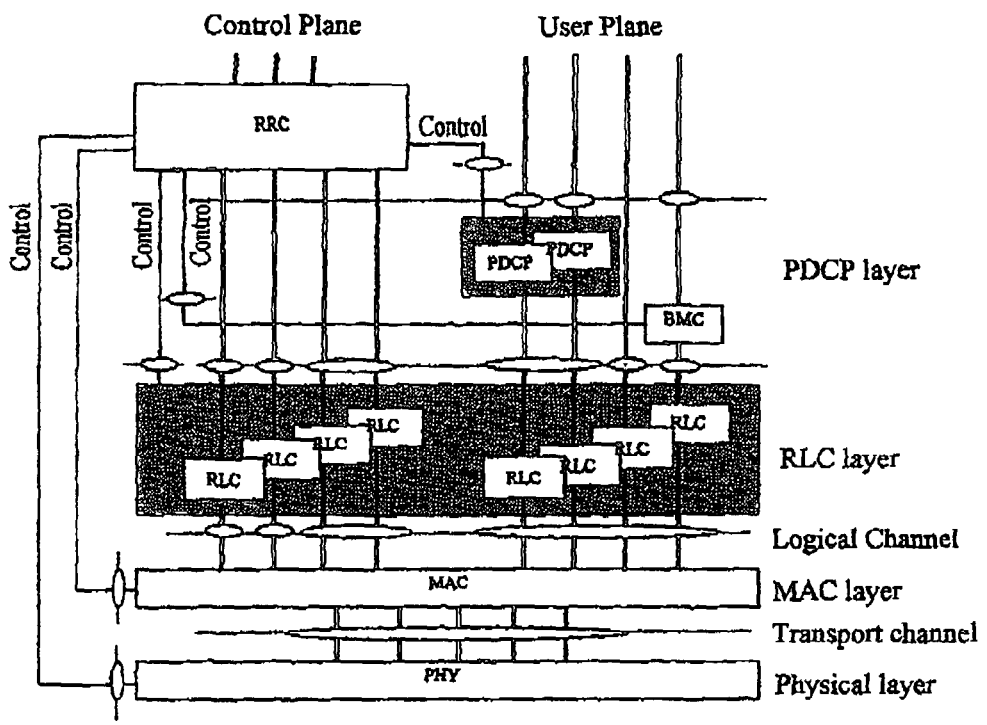
FIG. 4 shows a structure of a radio interface protocol.
Figure 5:
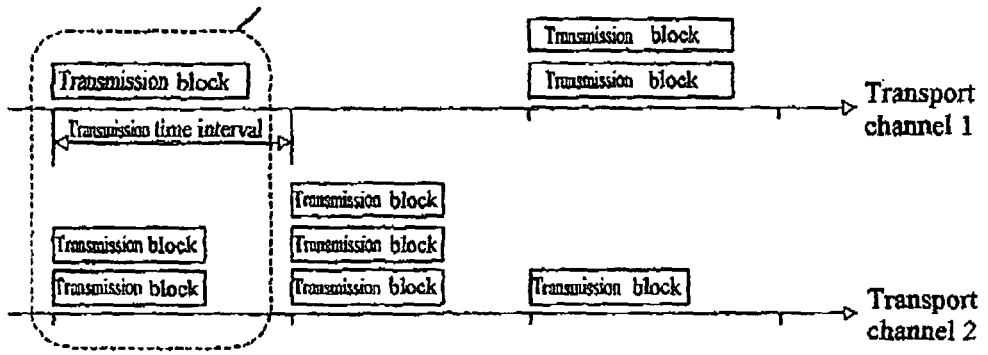
FIG. 5 is a schematic diagram showing transport channels, transmission blocks and a transport format combination.
Figure 6:
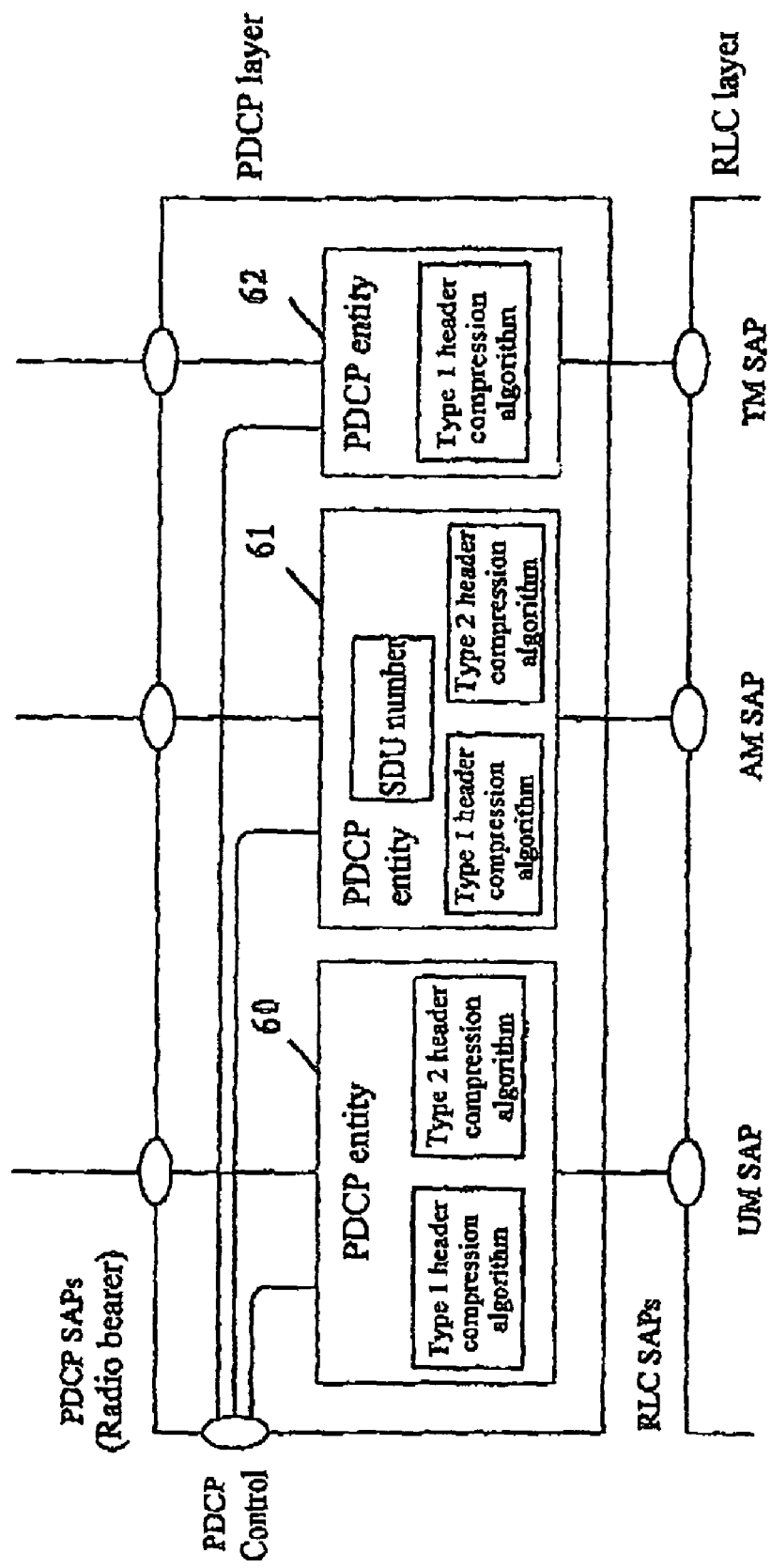
FIG. 6 shows an example of a structure of a PDCP layer.
Figure 7:
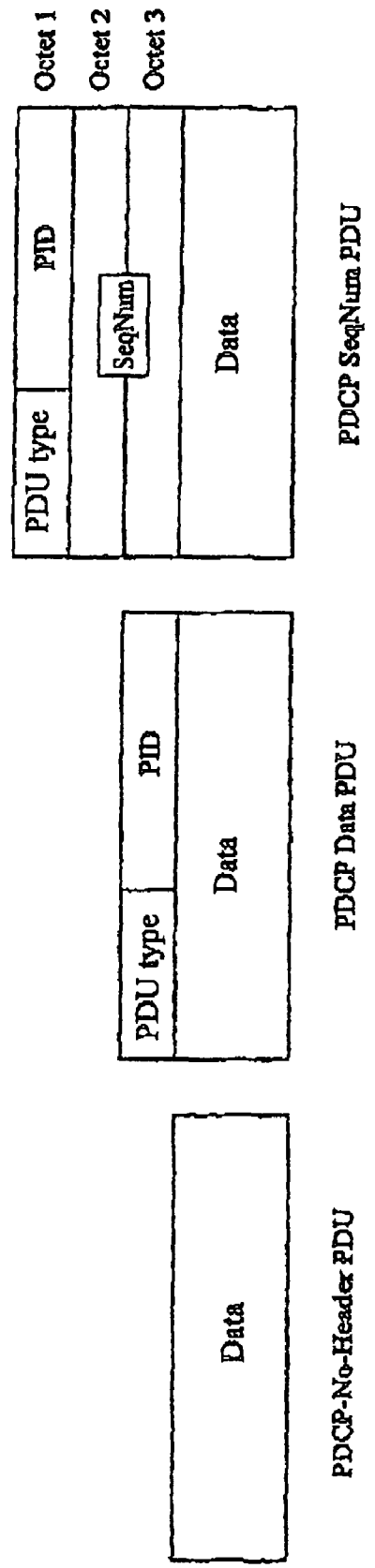
FIG. 7 shows a format of a PDCP layer PDU.
Figures 8, 11:
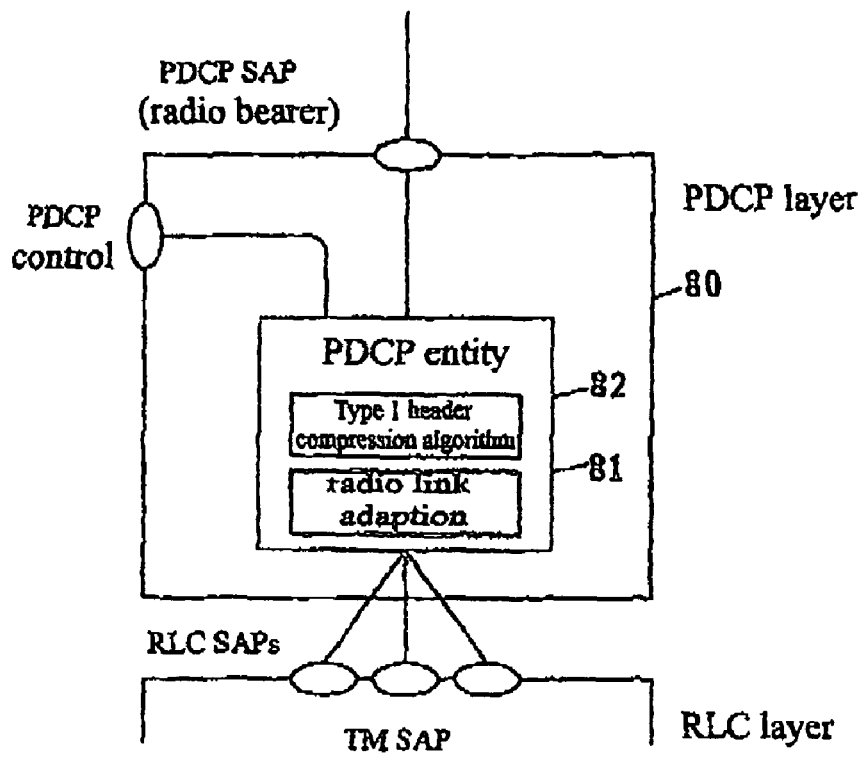
FIG. 8 is a schematic diagram showing a structure of a PDCP entity according to the invention.
FIG. 11 shows a new format of the PDCP layer PDU according to the invention.

First refer to FIG. 8 in which the structure of a PDCP entity 80 according to the invention is shown. The structure of the PDCP entity 80 according to the invention is similar to that of conventional PDCP entities 60-62 as shown in FIG. 6, but with a radio link adaptation unit 81 added. The adaptation unit 81 is located between a header compression unit 82 and an RLC layer 83. According to the invention, the radio link adaptation unit 81 has at least one of the following functions:

PDU size adaptation;

separating and combining the compressed header and the RTP payload;

dividing and combining the RTP payload based on the RTP payload format information; and RTCP packet scheduling.

The PDU size adaptation function of the radio link adaptation unit 81 ensures TFCI decoding and facilitates physical layer processing by adapting the PDU size to one of a plurality of fixed length types as needed by the system.

Further, the radio link adaptation unit 81 can separate the compressed header from the RTP payload so as to perform different error protection on the compressed header and the RTP payload, and can synchronously transmit the separated compressed header and RTP payload. After the compressed header is separated, the compressed header is preferably PDU-size adapted.

Further, on the premise that RNC knows the RTP payload format information, the radio link adaptation unit 81 can further divide the RTP payload into blocks so as to apply different error protection on different data blocks and perform synchronous transmission on the blocks. Additionally, according to an embodiment of the invention, the data blocks containing the compressed header may be PDU-size adapted.

In addition, in order to efficiently utilize radio resources and bandwidth, the radio link adaptation unit 81 can also schedule the transmission of the RTCP packet, so as to transmit the RTCP packet at a time when the RTP packet has high compression rate or there is no RTP packet to be transmitted, thereby avoiding the occurrence of large bandwidth requirement.

Again referring to FIG. 8, the RTP packet header-compressed by the header compression unit 82 is PDU-size adapted in the radio link adaptation unit 81, or the compressed header is separated from the RTP payload, or after the payload is further divided into blocks, it is mapped to an RLC entity for transmitting. The present invention preferably employs the TM mode RLC protocol.

Figure 9:
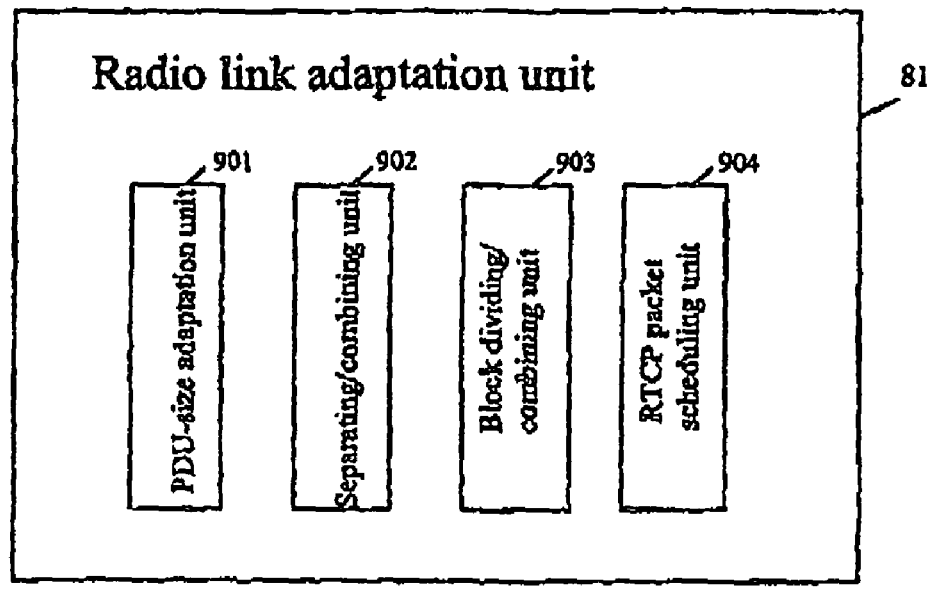
FIG. 9 shows a structure of a radio link adaptation unit according to the invention.

FIG. 9 shows an exemplary composition of the radio link adaptation unit 81 according to the invention, comprising a PDU size adaptation unit 901, a separating/combining unit 902, a blocking/combining unit 903 and an RTCP packet scheduling unit 904.

It is to be noted that, for the sake of simplicity, FIG. 8 only shows a PDCP entity 80, but there actually can be any number of PDCP entities. FIGS. 8 and 9 only show components relating to the implementation of the invention. In addition, the invention uses compression algorithms to compress the header of the RTP packet, but which compression method is used and how to compress is irrelevant to the implementation of the invention.

Figure 10:
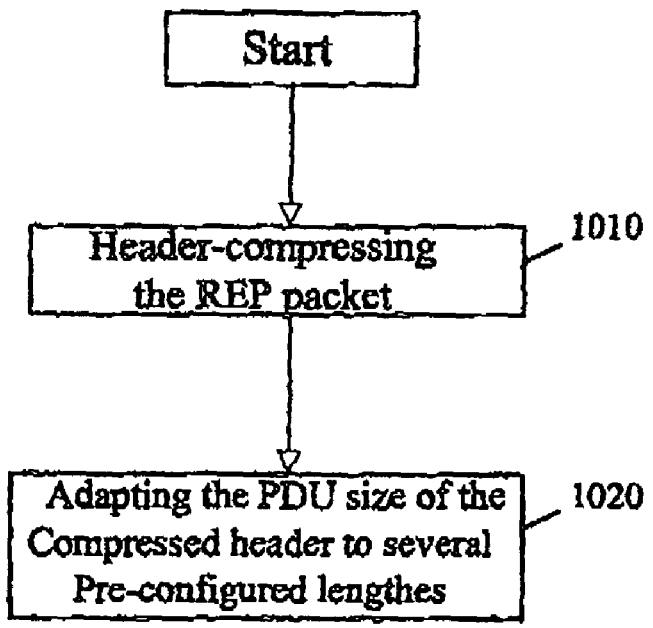
FIG. 10 is a flowchart diagram showing a method of adapting the size of a compressed header of an RTP packet according to the invention.

FIG. 10 is a flowchart diagram showing a method of adapting the size of the compressed header of the RTP packet according to the invention. First, in step 1010, a header compression unit 82 header-compresses the RTP packet, and delivers the header-compressed packet with variable size to the PDU size adaptation unit 901 of the radio link adaptation unit for size adaptation.

It should be noted that, in case the compressed header and the RTP payload are separately transmitted to apply the non-equal error protection (UEP) mechanism, it is the compressed header that is size adapted by the PDU size adaptation unit 901; or, in case RNC has the RTP payload format information and applies the UEP mechanism to different data blocks of the RTP payload, it is the data blocks containing the compressed header that are size adapted by the PDU size adaptation unit 901. The above two cases are described in detail below.

Next, in step 1020, the PDU size adaptation unit 901 adapts the header-compressed packet or the compressed header or the data blocks containing the compressed header to several pre-configured size-fixed lengths. The pre-configured size-fixed lengths and length types can be configured by for example system control plane via the PDCP control interface. Said lengths and length types depend upon the requirements of the system itself, typically are a tradeoff between the transmission efficiency and TFCI decoding reliability. Typically, when the RLC layer and MAC layer are transparently transmitted, this length is the size of the transmission block. The header-compressed packet or its compressed header or the data blocks containing the compressed header from the header compression algorithm unit shall be adapted to less than but closest to a pre-configured PDU length, with absent bits being padded.

In order to support said PDU size adaptation function, the present invention proposes a new PDCP layer PDU format as shown in FIG. 11, wherein a field "PID" (packet identification) has a same definition as in the current protocol, a field "PDU type" is added with a new value on the basis of the current protocol, indicative of the PDCP layer PDU type proposed by the invention. Specifically, in the current protocol, "000" in the "PDU type" field represents a PDCP data PDU type, "001" in the "PDU type" field represents a PDCP SeqNum PDU type, and "010-111" in the "PDU type" field are reserved values. According an example of the invention, a new value "010" in the "PDU type" field is defined to represent the PDU type proposed by the invention as shown in FIG. 11. A field "Length Indicator" can be configured to occupy one or two octet octets, and this length value is the length in octets that cover the entire PDCP layer PDU including the padding. In addition, a "data" field is the header compressed packet, or the compressed header (when the UEP mechanism that separately transmits the compressed header and the RTP payload is employed), or the data blocks containing the compressed header (when RNC has the RTP payload format information and the non-equal error protection for different data blocks of the RTP payload is employed) coming form the header compression algorithm unit.

At the receiving end, the packet data can be correctly recovered with reference to said PDU format information.

Figure 12:
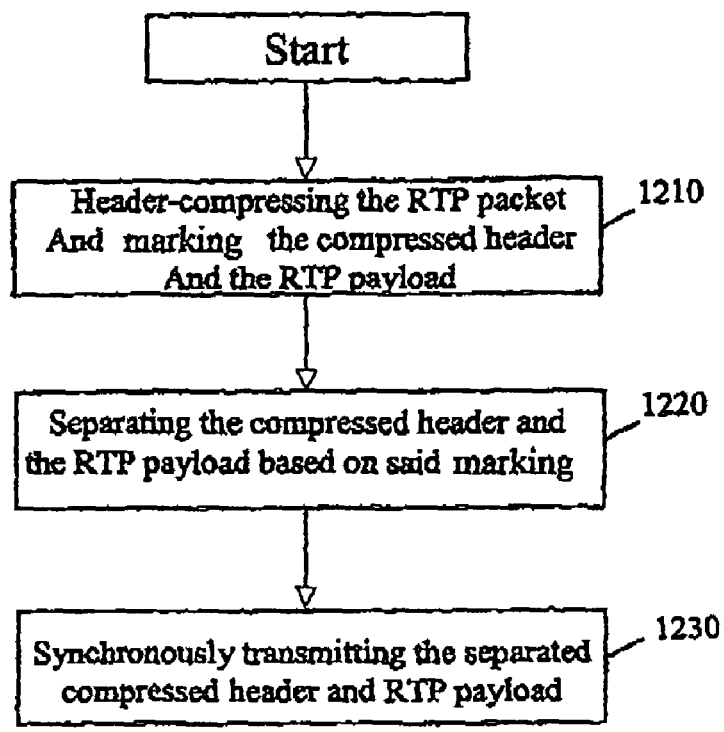
FIG. 12 is a flowchart diagram showing a process of separating the compressed header from the RTP payload of the RTP packet.

A second embodiment according to the invention will be described below in combination with FIGS. 12-14.

In the second embodiment, the UEP mechanism that separately transmits the compressed header and the RTP payload is employed. First, in step 1210, at the transmitting end, a header compression unit 1401 header-compresses the RTP packet, then delivers the header compressed packet to a separating unit 1402 of the radio link adaptation unit. The header compression unit 1401 is also responsible for marking the compressed header and the RTP payload of each header-compressed packet. In step 1220, the separating unit 1402 separates the RTP packet coming from the header compression algorithm unit into the compressed header and the RTP payload, based on the marking made by the header compression unit 1401 on the compressed header and the RTP payload, and respectively forms PDCP layer PDUs before mapping them to two different TM mode RLC entities.

According to a preferable embodiment of the invention, said PDU size adaptation function can be applied to the separated compressed header of the RTP packet, while not applied to the RTP payload.

In step 1230, a transmitting unit 1403 transmits said mapping to PDUs of different RLC entities. According to a preferable embodiment of the invention, said transmitting is performed on the same transmission time interval. In order to ensure that the compressed header and the RTP payload correspond to the synchronous transmission of the transport channel, the transport channel corresponding to the compressed header and the RTP payload is configured as "coordinated dedicated transport channel" in the user plane frame protocol (FP) of Iur/Iub interface inside the downlink UTRAN. According to another embodiment of the invention, it may be transmitted by a non-synchronous transmission. For example, by adding identifiers (such as sequence numbers) to the PDUs, the receiving party may equally understand which PDUs belong to the same RTP packet, so as to correctly combine them.

Figure 13:
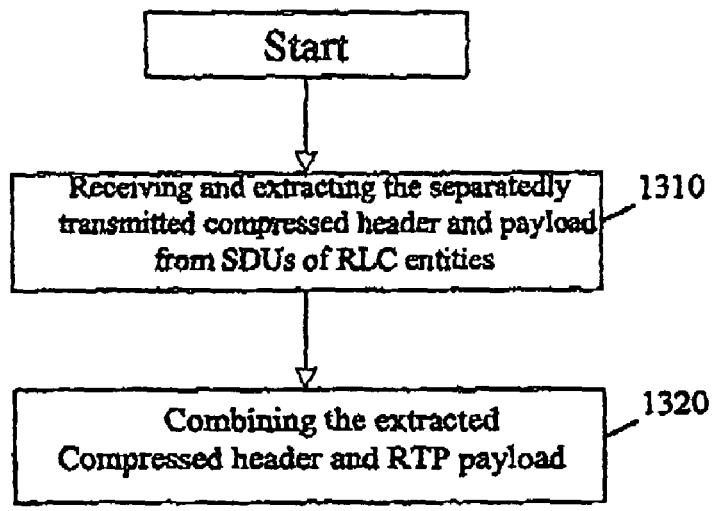
FIG. 13 is a flowchart diagram showing a process of combining the compressed header and the RTP payload of the RTP packet.
Figure 14:
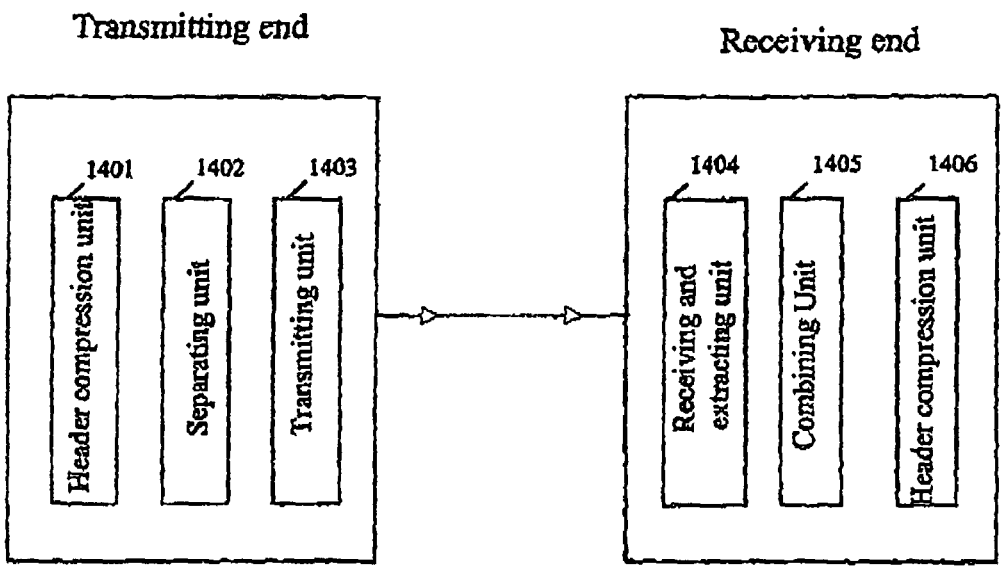
FIG. 14 is a block diagram showing separating and combining of the compressed header and the RTP payload of the RTP packet.

A corresponding process at the receiving end is shown in FIG. 13.

In step 1310, in case of a synchronous transmission mode, receiving and extracting means 1404 at the receiving end extracts the compressed header and corresponding RTP payload, respectively, from the SDU units of said two TM mode RLC entities. Then, in step 1320, a combining unit 1405 of a corresponding radio link adaptation unit combines the extracted compressed header and the corresponding RTP payload into a complete RTP header-compressed packet, so as to input to a corresponding header compression algorithm unit 1406. If in case of an asynchronous transmission mode, then the receiving end performs a combining operation with the identifiers of the PDUs.

Figure 17:
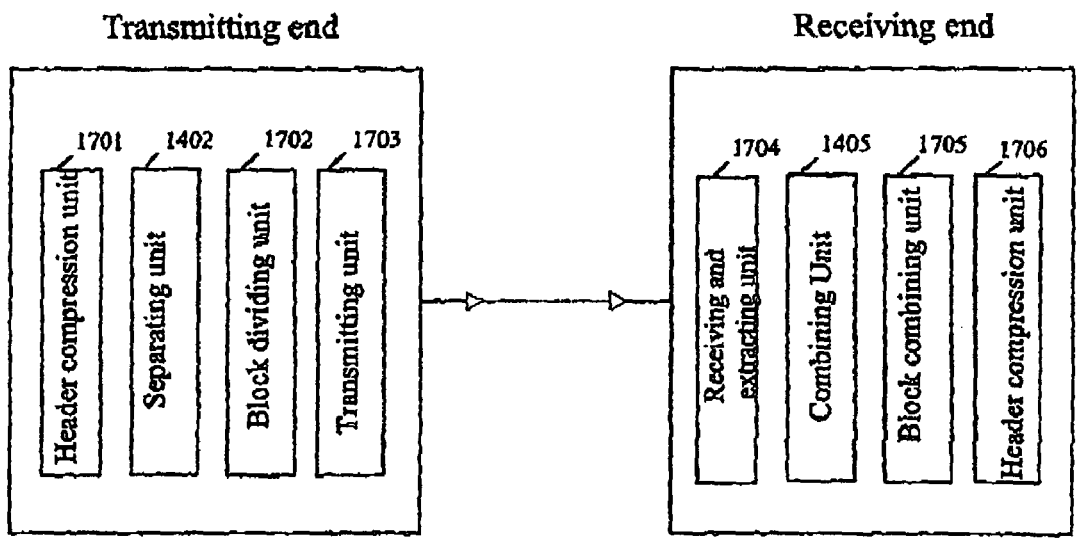
FIG. 17 is a block diagram showing dividing and combining the payload of the RTP packet according to the invention.
Figure 15:
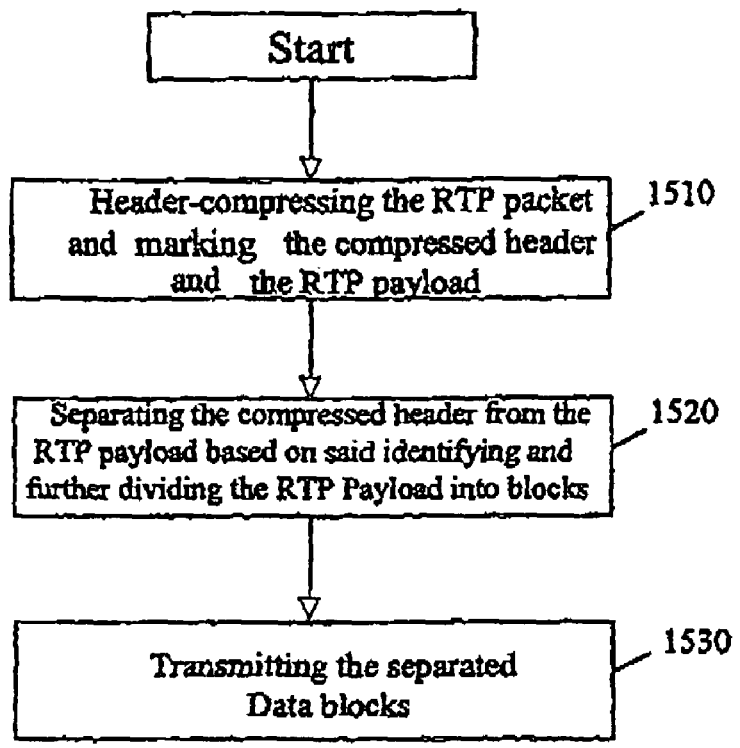
FIG. 15 is a flowchart diagram showing a process of dividing the RTP payload into blocks according to the invention.

A third embodiment according to the invention will be described below with reference to FIGS. 15-17.

The third embodiment relates to such a case that RNC has obtained the RTP payload format information including the RTP payload header and media data bits of different error sensitivities by means of appropriate signalling, and thereby applying non-equal error protection to different data blocks of the RTP payload. In step 1510, at the transmitting end, a header compression unit 1710 header-compresses the RTP packet to form a header-compressed packet, and delivers the header-compressed packet to the radio link adaptation unit. In step 1520, the separating unit 1402 and the block dividing unit 1702 of the radio link adaptation unit cooperate to separate the compressed header from the RTP payload according to the second embodiment, then the block dividing unit 1702 divides the RTP packet from the header compression algorithm unit into blocks of different error sensitivities using the RTP payload format information, to respectively form the PDCP layer PDUs before mapping them into different TM mode RLC entities.

According to a preferable embodiment of the invention, said PDU size adaptation function can be applied to thus-obtained compressed header of the RTP packet or the data blocks containing the compressed header, while not applied to the data blocks not containing the compressed header.

Taking the AMR service with a rate of 12.2 kbps in the IMS domain as an example, the header compressed RTP packet may be divided into the compressed header, the RTP payload header, A-type bit, B-type bit and C-type bit, or the RTP payload header and the A-type bit may be combined into the same data block, or the compressed header, the RTP payload header and the A-type bit may be combined into the same data block.

In step 1530, a transmitting unit 1703 transmits PDUs corresponding to the blocks. According to one embodiment of the invention, said transmitting is performed on the same transport time interval. Again, in the user plane frame protocol (FP) of Iur/Iub interface inside the downlink UTRAN, the transport channel corresponding to the compressed header and the RTP payload is configured as "Coordinated dedicated transport channel", so as to ensure synchronous transmission of the transport channels corresponding to the compressed header and the RTP payload. According to another embodiment of the invention, the synchronous transmission may be not used. For example, by adding identifiers (such as sequence numbers) to the PDUs, the receiving party also knows which PDUs belong to the same RTP packet, thus correctly combines them.

Figure 16:
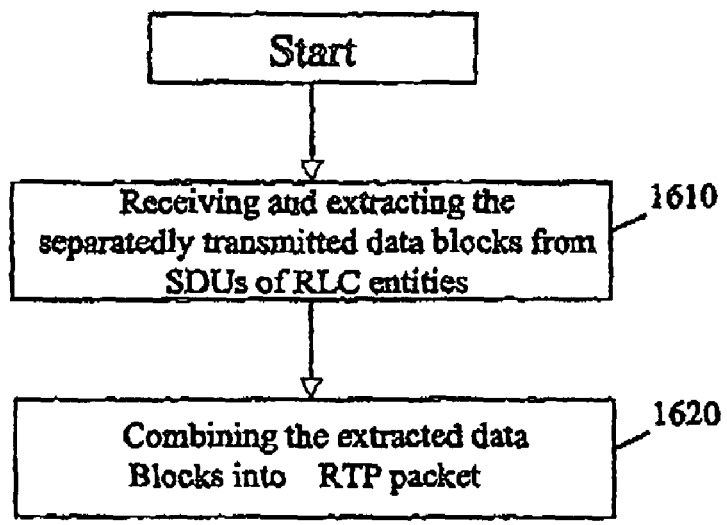
FIG. 16 is a flowchart diagram showing a process of combining data blocks of the RTP payload according to the invention.

FIG. 16 shows a corresponding process at the receiving end.

In step 1610, in case of synchronous transmission, a receiving and extracting unit 1704 at the receiving end extracts data blocks of the RTP packet, respectively, from the SDU units of the TM mode RLC entities. Then, in step 1620, The combining unit 1405 and block combining unit 1705 of a corresponding radio link adaptation unit cooperate to combine them into a complete RTP header-compressed packet, and input to a corresponding header compression algorithm unit 1706. If in case of asynchronous transmission, the receiving end combines them by identifying the identifiers of PDUs.

A fourth embodiment of the invention will be described below with reference to FIGS. 18-19.

The inventor recognizes that, when the RTP/UDP/IP and RTCP/UDP/IP packets of the same type of media data stream are transmitted over the same UMTS bearing channel, it is possible to reduce the instantaneous peak requirement on the radio channel bandwidth by scheduling the transmission of the RTCP packet, so as to efficiently utilize the radio resources and bandwidth. The following will be described by taking the ROHC header compression algorithm as an example. However, those skilled in the art would appreciate that, the present invention uses the compression algorithm to compress the header of the RTP packet, but which compression method is used and how to achieve the compression is irrelevant to the implementation of the invention. Therefore, the present invention is not limited to the ROHC header compression algorithm, but may be adapted to any suitable header compression algorithms.

For the ROHC header compression algorithm, when the compressing end transmits IR or IR-DYN type packet to the decompressing end, the header of the RTP packet is very large or even exceeds the header of an uncompressed packet. At this time, ff there is RTCP packet to be transmitted simultaneously, a radio channel bandwidth much larger than the usual is needed, which brings difficulty for the distribution of radio bandwidth and radio resources. Since the RTCP packet has a low real-time requirement, according to the invention, the RTCP packet is buffered by the RTCP packet scheduling function of the radio link adaptation function unit, and the RTCP packet is transmitted after the context of the compressing and decompressing ends get synchronized and the header of the packet obtains a higher compression rate. In addition, since the transmission frequency of the RTCP packet is always low, and the activating factor of voice service is generally 0.4~0.6 with comparatively frequent silence period, for AMR or AMR-WB service, the RTCP packet scheduling function can further schedule the RTCP packet to enable it to be transmitted during the voice silence period, to thereby efficiently utilize the radio resources and bandwidth. This principle also applies to other real-time IP multimedia services in the IMS domain with small activating factor.

Figure 18:
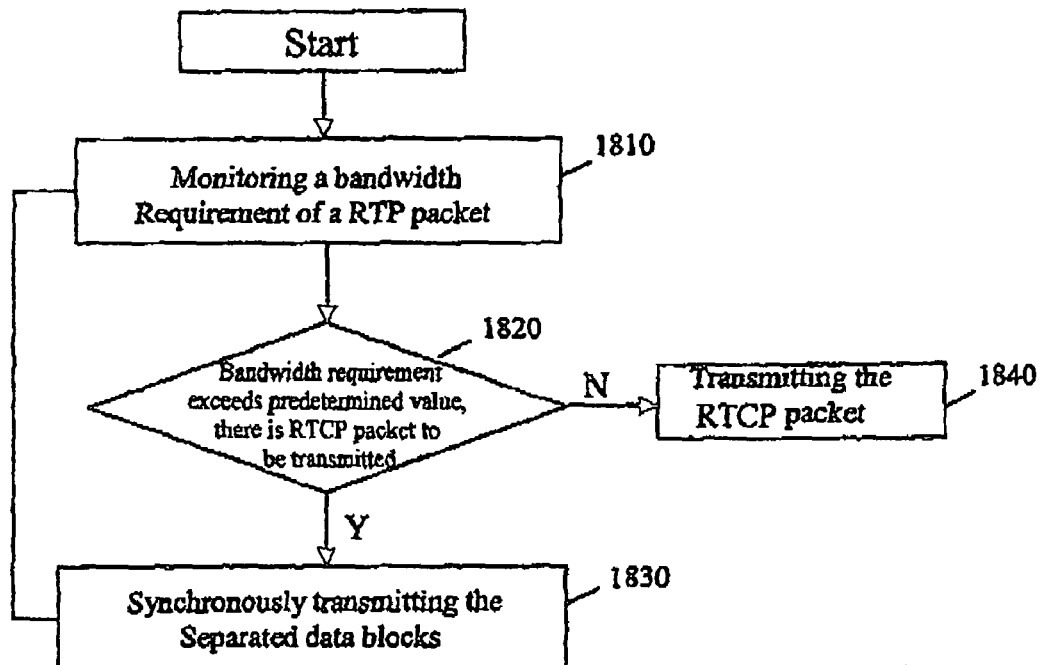
FIG. 18 is a flowchart diagram showing an RTCP scheduling method according to the invention.
Figure 19:
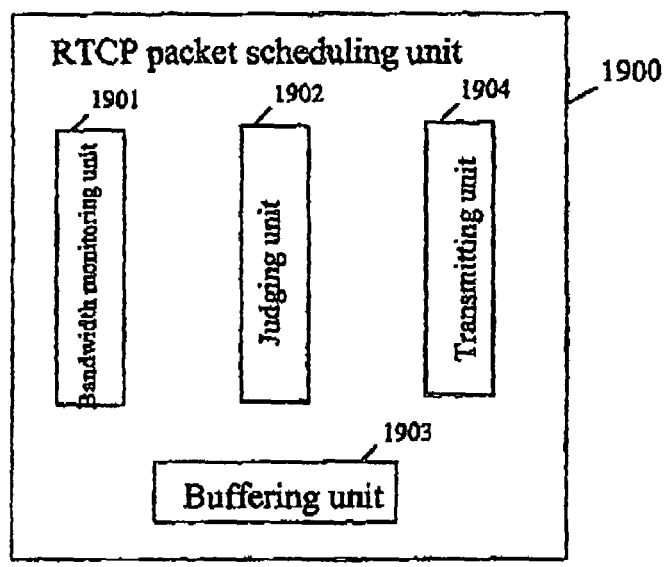
FIG. 19 is a block diagram showing an RTCP scheduling system according to the invention.

FIG. 18 shows a flowchart diagram according to the fourth embodiment of the invention. In the fourth embodiment, first, in step 1810, monitoring means 1901 of an RTCP packet scheduling unit 1900 of the radio link adaptation unit monitors a bandwidth requirement of the RTP packet. In step 1820, a judging unit 1902 judges whether the RTP bandwidth requirement exceeds a predetermined value and there is an RTCP to be transmitted. It should be noted that, said predetermined value is determined by the system according system demand. If the result of the judgement is "YES", then the process proceeds to step 1830 where the RTCP packet is buffered in the buffering unit 1903. At this time, the process returns to step 1810 to continue monitoring the bandwidth requirement of the RTP packet. If in step 1820, it is judged that the bandwidth requirement of the RTP packet does not exceed the predetermined value and there is an RTCP packet to be transmitted, then the process proceeds to step 1840 where the transmitting unit 1904 transmits the RTCP packet.

The present invention has been described above in connection with the embodiments of the invention. However, it is apparent to those skilled in the art that, the description herein is merely illustrative and shall not be construed as any limitation to the invention. For example, although the embodiments of the invention employ the TM mode RLC protocol, in case of UM mode RLC protocol, the function of separating the compressed header from the RTP payload, the function of dividing the RTP payload into blocks based on the RTP payload format information and the RTCP packet scheduling function of the invention are equally applicable.

In addition, the embodiments of the invention have been described in connection with the WCDMA system. However, those skilled in the art would appreciate that, the present invention not only applies to the WCDMA system, but also applies to IS-95, cdma2000 and TD-SCDMA systems.

The present invention may be achieved in the form of software, hardware or a combination of both. Those skilled in the art may make any variation or modification to the invention in light of the disclosure of the specification. However, all these variations and modifications fall into the scope and spirit of the invention defined by the accompanying claims.

The invention claimed is:

1. A method of radio transmission of real-time IP packets using header compression, comprising:
   header-compressing a number of RTP packets by marking a compressed header and an RTP payload and separating the compressed header from the RTP packet based on said marking before a PDU-size adapting of the header-compressed RTP packet, to obtain header-compressed RTP packets having a plurality of different header compression lengths, wherein a single compressed header corresponds to a single RTP payload in each of the header-compressed RTP packets;
   pre-configuring header compression lengths and length types required by the system; and
   PDU-size adapting the plurality of different header compression lengths of the header-compressed RTP packets, so as to comply with said lengths and length types required by the system.

2. A method according to claim 1, further comprising, after separating the compressed header from the RTP payload based on said marking, further dividing the RTP payload into blocks of different sensitivities based on the RTP payload format information, then PDU-size adapting the separated compressed header.

3. A method according to claim 1, further comprising applying a UEP mechanism to the separated compressed header and the RTP payload, or the separated compressed header and the data blocks of the RTP payload, or the data blocks containing the compressed header and the remaining RTP payload data blocks.

4. A method according to claim 1, further comprising mapping the separated compressed header and the RTP payload, or the separated compressed header and the data blocks of the RTP payload, or the data blocks containing the compressed header and the remaining RTP payload data blocks to different RLC entities for transmission.

5. A method according to claim 1, further comprising transmitting the compressed header and the RTP payload, or the separated compressed header and the data blocks of the RTP payload, or the data blocks containing the compressed header and the remaining RTP payload data blocks on the same transmission time interval, and configuring corresponding transport channels thereof as coordinated dedicated transport channels.

6. A method according to claim 1, further comprising receiving and extracting, at a receiving end, the compressed header and the RTP payload, or the separated compressed header and the data blocks of the RTP payload, or the data blocks containing the compressed header and the remaining RTP payload data blocks, from RLC entity SDU corresponding to the compressed header and the RTP payload, or the separated compressed header and the data blocks of the RTP payload, or the data blocks containing the compressed header and the remaining RTP payload data blocks, respectively.

7. A method according to claim 1, wherein the lengths and length types required by the system depend on a tradeoff between transmission efficiency and TFCI decoding reliability.

8. A method according to claim 2, further comprising, after dividing the RTP payload into blocks of different error sensitivities, combining the compressed header with at least one data blocks of the RTP payload, then PDU-size adapting the data blocks containing said compressed header.

9. A method according to claim 4, wherein the RLC entity is a TM mode RLC entity.

10. A method according to claim 6, further comprising combining the extracted compressed header and the RTP payload, or the separated compressed header and the data blocks of the RTP payload, or the data blocks containing the compressed header and the remaining RTP payload data blocks, into a complete RTP packet.

11. A system of radio transmission of real-time IP packet using header compression, comprising:
a header compression unit to header-compress RTP packets, being configured to mark a compressed header and an RTP payload and separate the compressed header from the RTP packet based on said marking before a PDU-size adapting of the header-compressed RTP packet, to obtain header-compressed RTP packets having a plurality of different header compression lengths, wherein a single compressed header corresponds to a single RTP payload in each of the header-compressed RTP packets;
a configuring unit to pre-configure header compression lengths and length types required by the system; and
a radio link adaptation unit to PDU-size adapt the plurality of different header compression lengths of the header-compressed RTP packets, so as to comply with said lengths and length types required by the system.

12. A method of transmitting real-time IP packets using header compression, comprising:
header-compressing RTP packets and marking a compressed header and an RTP payload, wherein a single compressed header corresponds to a single RTP payload in each of the header-compressed RTP packets;
separating the compressed header from the RTP payload based on said marking, to respectively form PDCP layer PDUs before mapping them to different RLC entities; and
transmitting the separated compressed header and RTP payload.

13. A method according to claim 12, further comprising after separating the compressed header from the RTP payload, PDU-size adapting the compressed header, such that the plurality of different header compression lengths obtained when header- compressing the RTP packet are adapted to lengths and length types required by the system, and then making the PDU-size-adapted compressed header and the RTP payload to respectively form PDCP layer PDUs before mapping them into different RLC entities.

14. A method according to claim 12 or 13, further comprising, after separating the compressed header from the RTP payload, further dividing the RTP payload into blocks of different error sensitivities based on RTP payload format information.

15. A method according to claim 12, further comprising combining the separated compressed header with at least one data blocks of the RTP payload, and PDU-size adapting the data blocks containing said compressed header.

16. A method according to claim 12, further comprising applying a UEP mechanism to the separated compressed header and the RTP payload, or the data blocks containing the compressed header and the remaining RTP payload data blocks.

17. A method according to claim 12, further comprising transmitting the separated compressed header and the RTP payload, or the data blocks containing the compressed header and the remaining RTP payload data blocks on the same transmission time interval, and configuring the corresponding transport channels thereof as coordinated dedicated transport channels.

18. A method according to claim 12, wherein the RLC entity is a TM mode RLC entity.

19. A method of receiving real-time IP packets using header compression, wherein a compressed header of the header-compressed packet is separated from an RTP payload thereof at the transmitting end to form different PDCP layer PDUs that are transmitted on different RLC entities, and wherein a single compressed header corresponds to a single RTP payload in each of the header-compressed RTP packets, said method comprising:
receiving and extracting the compressed header and the RTP payload from SDUs of the RLC entities; and
combining the extracted compressed header with the RTP payload.

20. A system of transmitting a real-time IP packet using header compression, comprising:
a header compression unit to header-compress RTP packets and mark a compressed header and an RTP payload, wherein a single compressed header corresponds to a single RTP payload in each of the header-compressed RTP packets;

a radio link adaptation unit to separate the compressed header from the RTP payload based on said marking, to respectively form PDCP layer PDUs before mapping the respective PDCP layer PDUs to different RLC entities; and a transmitter to transmit the separated compressed header and RTP payload.

21. A system of receiving a real-time IP packet using header compression, wherein a compressed header of the header-compressed packet is separated from an RTP payload thereof at the transmitting end to form different PDCP layer PDUs that are transmitted on different RLC entities, wherein a single compressed header corresponds to a single RTP payload in each of the header-compressed RTP packets, said system comprising:

receiving and extracting unit for to receive and extract the compressed header and the RTP payload from SDUs of the RLC entities; and radio link adaptation unit for combining the extracted compressed header with the RTP payload.

22. An RTCP packet scheduling method, comprising:

monitoring whether or not the bandwidth requirement of the RTP packet exceeds a predetermined value;

if the bandwidth requirement of the RTP packet exceeds the predetermined value and there is an RTCP packet to be transmitted, buffering the RTCP packet; and continuously monitoring the bandwidth requirement of the RTP packet, and transmitting the RTCP packet when the bandwidth requirement is lower than the predetermined value.

23. A method according to claim 22, wherein the bandwidth requirement being lower than the predetermined value comprises the case where the compression rate of the RTP packet is so high that the bandwidth requirement is lower than the predetermined value.

24. A method according to claim 22, wherein the bandwidth requirement being lower than the predetermined value comprises the case where no RTP packet is transmitted.

25. An RTCP packet scheduling system, comprising:

bandwidth monitoring means for monitoring whether or not the bandwidth requirement of the RTP packet exceeds a predetermined value;

judging means for judging, whether the bandwidth requirement of the RTP packet exceeds the predetermined value and there is an RTCP packet to be transmitted;

buffering means for buffering the RTCP packet, in response to the result of the judging means that the bandwidth requirement of the RTP packet exceeds the predetermined value; and transmitting means for transmitting the RTCP packet, in response to the result of the judging means that the bandwidth requirement of the RTP packet does not exceed the predetermined value.

\* \* \* \* \*